US009098702B2

(12) United States Patent
Rubin et al.

(10) Patent No.: US 9,098,702 B2
(45) Date of Patent: *Aug. 4, 2015

(54) CONTROLLING MALICIOUS ACTIVITY DETECTION USING BEHAVIORAL MODELS

(71) Applicant: Microsoft Technology Licensing, LLC, Redmond, WA (US)

(72) Inventors: Shai A. Rubin, Binyamina (IL); Yosef Dinerstein, Haifa (IL); Efim Hudis, Bellevue, WA (US); Yair Helman, Kefar Neter (IL); Uri Barash, Redmond, WA (US); Arie Friedman, Petach-Tikva (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/942,099

(22) Filed: Jul. 15, 2013

(65) Prior Publication Data

US 2013/0305374 A1 Nov. 14, 2013

Related U.S. Application Data

(63) Continuation of application No. 12/408,453, filed on Mar. 20, 2009, now Pat. No. 8,490,187.

(51) Int. Cl.
| | |
|---|---|
| *G06F 11/00* | (2006.01) |
| *G06F 21/56* | (2013.01) |
| *G06F 21/55* | (2013.01) |
| *H04L 29/06* | (2006.01) |
| *G06F 3/0484* | (2013.01) |
| *G06F 12/14* | (2006.01) |
| *G06F 7/04* | (2006.01) |
| *G06F 17/30* | (2006.01) |

(52) U.S. Cl.
CPC .............. *G06F 21/56* (2013.01); *G06F 3/0484* (2013.01); *G06F 21/554* (2013.01); *H04L 63/0263* (2013.01); *H04L 63/1416* (2013.01)

(58) Field of Classification Search
CPC ... G06F 21/56; G06F 21/577; H04L 63/1416; H04L 63/1408; H04L 63/1433; H04L 63/1441; H04L 63/145; H04L 63/1466
See application file for complete search history.

(56) References Cited

U.S. PATENT DOCUMENTS

| | | |
|---|---|---|
| 5,968,176 A | 10/1999 | Nessett et al. |
| 7,103,874 B2 | 9/2006 | McCollum et al. |

(Continued)

OTHER PUBLICATIONS

Giffin, Jonathon T., "Model-based Intrusion Detection System Design and Evaluation", Retrieved at <<http://www.cc.gatech.edu/~giffin/papers/phd06/Gif06.pdf>>, 2006, pp. 173.

(Continued)

*Primary Examiner* — Dede Zecher
*Assistant Examiner* — Trang Doan
(74) *Attorney, Agent, or Firm* — Timothy Churna; Kate Drakos; Micky Minhas

(57) ABSTRACT

Systems, methods, and computer program products are described for controlling malicious activity detection with respect to information technology assets based on behavioral models associated with the respective information technology assets. Protection rules and corresponding sensitivities associated with the behavioral models are applied by protection services to detect malicious activity with respect to the information technology assets.

20 Claims, 16 Drawing Sheets

(56) References Cited

U.S. PATENT DOCUMENTS

| | | | |
|---|---|---|---|
| 7,243,374 B2* | 7/2007 | Howard et al. | 726/25 |
| 7,409,714 B2 | 8/2008 | Gupta et al. | |
| 7,600,005 B2* | 10/2009 | Jamkhedkar et al. | 709/220 |
| 7,904,962 B1 | 3/2011 | Jajodia et al. | |
| 8,214,364 B2* | 7/2012 | Bigus et al. | 707/737 |
| 8,413,237 B2* | 4/2013 | O'Rourke et al. | 726/23 |
| 2002/0095591 A1 | 7/2002 | Daniell et al. | |
| 2003/0033516 A1* | 2/2003 | Howard et al. | 713/152 |
| 2004/0015719 A1 | 1/2004 | Lee et al. | |
| 2004/0054925 A1 | 3/2004 | Etheridge et al. | |
| 2005/0251570 A1 | 11/2005 | Heasman et al. | |
| 2006/0005228 A1 | 1/2006 | Matsuda | |
| 2006/0095963 A1 | 5/2006 | Crosby et al. | |
| 2006/0218640 A1* | 9/2006 | Lotem et al. | 726/25 |
| 2007/0094724 A1 | 4/2007 | Naedele | |
| 2007/0226796 A1 | 9/2007 | Gilbert et al. | |
| 2007/0240217 A1* | 10/2007 | Tuvell et al. | 726/24 |
| 2008/0047009 A1 | 2/2008 | Overcash et al. | |
| 2008/0162452 A1 | 7/2008 | Cox et al. | |
| 2009/0007220 A1 | 1/2009 | Ormazabal et al. | |
| 2010/0031232 A1* | 2/2010 | Glazier et al. | 717/106 |
| 2010/0095381 A1* | 4/2010 | Levi | 726/25 |

OTHER PUBLICATIONS

Debar, et al., "Towards a Taxonomy of Intrusion Detection Systems", Retrieved at <<http://perso.rd.francetelecom.fe/debar/papers/DebDacWes99.pdf>>, Oct. 28, 1998, pp. 1-31.

Tedesco, et al., "Strategic Alert Throttling for Intrusion Detection System", Retrieved at <<http://ima.ac.uk/papers/tedesco2005.pdf>>, 2005, pp. 1-6.

Yu Jinqiao, "TRINETR: An Intrusion Detection Alert Management and Analysis System", Retrieved at <<http://siplab.csee.wvu.edu/research/TRINETR/Dissertation.pdf>>, 2004, pp. 167.

Ben-Cohen, et al., "Korset: Automated, Zero False-Alarm Intrusion Detection for Linux", Retrieved at<<http://www.kernel.org/doc/ols/2008/ols2008v1-pages-31-38.pdf>>, Jul. 23-26, 2008, Ottawa, Ontario, Canada, pp. 10.

* cited by examiner

| First Example Protection Rules | Functions |
|---|---|
| SPAM Detection | Detects a computer that sends SPAM. |
| Click fraud | Detects a computer that perform click fraud. |
| Outbound bandwidth | Detects a computer that sends much data outside the organization. |
| Bot access | Detects a computer that accesses a destination that no one else in the organization accessed (e.g., the destination may be a central management of a botnet). |
| Horizontal scan | Detects a computer that performs network scanning. |
| Established TCP connections | Detects a computer that establishes many concurrent TCP connections (e.g., may be an indication of a bot). |
| Denied connections | Detects a computer that cause many denied actions on the firewall. |
| Vulnerability scan | Detects a computer that performs network scanning. |
| Vertical scan | Detects a computer that performs network scanning. |
| GAPA signature hit | Detects a computer that attempts to exploit another computer over the network. |
| Failed HTTP request | |
| Honey pot | Detects a computer that performs network scanning. |
| Second Example Protection Rules | Functions |
| Reappeared compromised computer | |
| Reappeared vulnerable rule | |
| Computer which is likely to get compromised is vulnerable rule (past week) | |
| Computer which is likely to get compromised is vulnerable rule (past month) | These rules attempt to identify a repeating pattern of assessments on a computer. |
| Repeated, low fidelity assessments are untreated rule (past month) | |
| Repeated, low fidelity assessments are untreated rule (past week) | |

| Third Example Protection Rules | Functions |
|---|---|
| User Computer Mapping Rule User To Computer mapping | Detects when a user logs into a compromised computer. |
| Generic vulnerabilities IN rule (missing patch IN policy) | These rules deal with detection computers with missing patches |
| Host protection vulnerabilities IN rule | |
| Generic vulnerabilities OUT rule (missing patch OUT policy) | |
| Host protection vulnerabilities OUT rule | |
| Active Malware | These rules deal with detecting malware on a computer. |
| Cleaned Malware | |
| Very infected - last 4 hours | |
| Very infected - last 24 hours | |
| Very infected - last 48 hours | |
| Re-infected - last 24 hours | |
| Re-infected - last 48 hours | |
| A User Cleaned a Security Event log | These rules detect activity that changes audit policy on a computer. Such changes may be a result of a malicious activity. |
| A User Cleaned a System Time | |
| A User Changed an Audit Policy | |
| A User Created a Backdoor Account | |

FIG. 8

| | Detection Sensitivity 906 / 908 / 910 | | |
|---|---|---|---|
| Protection Rule | Low | Normal | High |
| SPAM Detection | Disabled | If enabled, in model use *middle* threshold | If enabled, in model use *low* threshold |
| Click fraud | Disabled | If enabled, in model use *middle* threshold | If enabled, in model use *low* threshold |
| Outbound bandwidth | If enabled, in model use *high* threshold | If enabled, in model use *middle* threshold | If enabled, in model use *low* threshold |
| Bot access | Disabled | If enabled, in model use *middle* threshold | If enabled, in model use *low* threshold |
| ⋮ | ⋮ | ⋮ | ⋮ |

CONTROLLING MALICIOUS ACTIVITY DETECTION USING BEHAVIORAL MODELS

CROSS-REFERENCE TO RELATED APPLICATION(S)

This application is a continuation of U.S. patent application Ser. No. 12/408,453, filed Mar. 20, 2009 (now U.S. Pat. No. 8,490,187), the entirety of which is incorporated by reference herein.

BACKGROUND OF THE INVENTION

1. Field of the Invention

The present invention generally relates to security of information technology assets. In particular, the present invention is related to controlling malicious activity detection with respect to information technology assets based on behavioral models associated with the respective information technology assets.

2. Background

An information technology security system (ITSS) leverages protection services to maintain a secure environment for information technology (IT) assets, such as computers, user accounts, services, applications, an enterprise network, etc. Each protection service monitors respective designated aspects of one or more IT assets and may perform any of a variety of protection functions, such as edge firewall, anti-virus, network-based intrusion detection system (IDS), host-based IDS, etc.

Conventional ITSSs typically require an administrative user to set an enablement and/or sensitivity parameter for each of the numerous protection rules that may be applied by the protection services during a malicious activity (e.g., computer virus, computer worm, etc.) detection operation. Setting the parameters is rather burdensome and requires a relatively detailed knowledge of the functions of the protection rules with which the parameters are associated. For instance, the administrative user should know how changing the enablement and/or sensitivity of a protection rule affects a message, called an assessment, that a protection service generates from the malicious activity detection operation.

SUMMARY

Systems, methods, and computer program products are described herein for controlling malicious activity detection with respect to information technology (IT) assets based on behavioral models associated with the respective IT assets. For instance, a user may select behavioral model(s) to be associated with an IT asset. Protection services are deployed on one or more processing modules, such as client computers or servers in an enterprise network, remotely located computers that are accessible through a network (e.g., the Internet), or processors operating on a single computer that may not be connected to a network. The protection services use respective protection rule configurations that are associated with selected behavioral model(s) to perform the malicious detection operations with respect to the IT asset. Each protection rule configuration includes protection rules and sensitivities associated therewith that correspond to the selected behavioral model(s). For instance, a behavioral model may be indicative of a designated type of user account, a computer having a designated functionality, etc.

In an example method, a graphical interface element is provided at a device, such as a client computer or an administrative computer in an enterprise network. The graphical interface enables an administrative user to select a behavioral model to be associated with an IT asset, such as a client computer, a server, a user account, a service, an application, an enterprise network, etc. A behavioral model indicator indicating the selected behavioral model is distributed to each of a plurality of protection services to cause a plurality of protection services to utilize a plurality of respective protection rule configurations that correspond to the behavioral model to generate respective malicious activity assessments with respect to the IT asset. An assessment is a message about a security state of an IT asset.

In another example method, a plurality of protection rule configurations corresponding to a plurality of respective behavioral models is stored in storage. Each protection rule configuration includes a plurality of protection rules having respective rule sensitivities. A behavioral model indicator associating an IT asset with a first behavioral model of the plurality of behavioral models is received. The first behavioral model corresponds to a first protection rule configuration of the plurality of protection rule configurations. A malicious activity assessment is generated with respect to the IT asset using one or more processors based on the first protection rule configuration.

An example system includes storage, a detection module, and an assessment module. The storage is configured to store a plurality of protection rule configurations corresponding to a plurality of respective behavioral models. Each protection rule configuration includes a plurality of protection rules having respective rule sensitivities. The detection module is configured to detect a behavioral model indicator that associates an IT asset with a first behavioral model of the plurality of behavioral models. The first behavioral model corresponds to a first protection rule configuration of the plurality of protection rule configurations. The assessment module is configured to generate a malicious activity assessment with respect to the IT asset based on the first protection rule configuration in response to the behavioral model indicator being detected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 7 and 8 show tables of some example protection rules and respective functionalities in accordance with embodiments of the present invention.

FIG. 10 shows a table of some example protection rules and respective sensitivities based on selectable detection sensitivities that may be associated with an information technology asset based on a selected behavioral model in accordance with an embodiment of the present invention.

Figure 16:
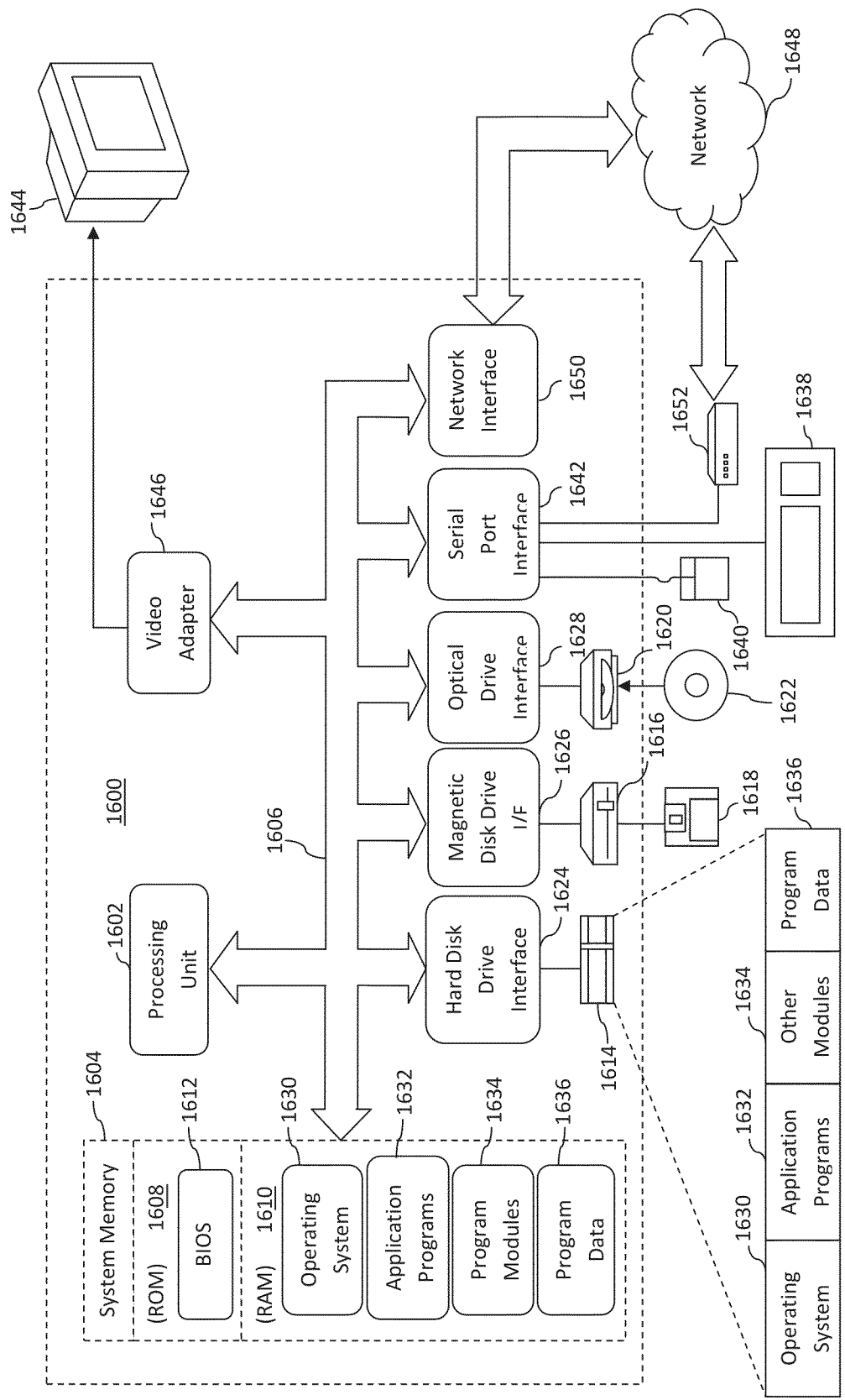

FIG. 16 depicts an exemplary implementation of a computer in which embodiments of the present invention may be implemented The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention. For instance, although the embodiments described herein refer specifically, and by way of example, to an enterprise network environment, it will be readily apparent to persons skilled in the relevant art(s) that embodiments are equally applicable within the context of a single computer, which may not be connected to a network.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments for Controlling Malicious Activity Detection

Embodiments of the present invention enable an administrative user in an enterprise network, for example, to select behavioral models to be associated with respective information technology (IT) assets, such as computers and user accounts. Protection services are deployed in the enterprise network to detect malicious activity that occurs with respect to the IT assets. Each protection service uses a respective configuration of protection rules corresponding to the selected behavioral model for an IT asset to detect malicious activity with respect to that IT asset. Each protection rule configuration includes protection rules and associated sensitivities thereof that correspond to the selected behavioral model.

Figure 1:
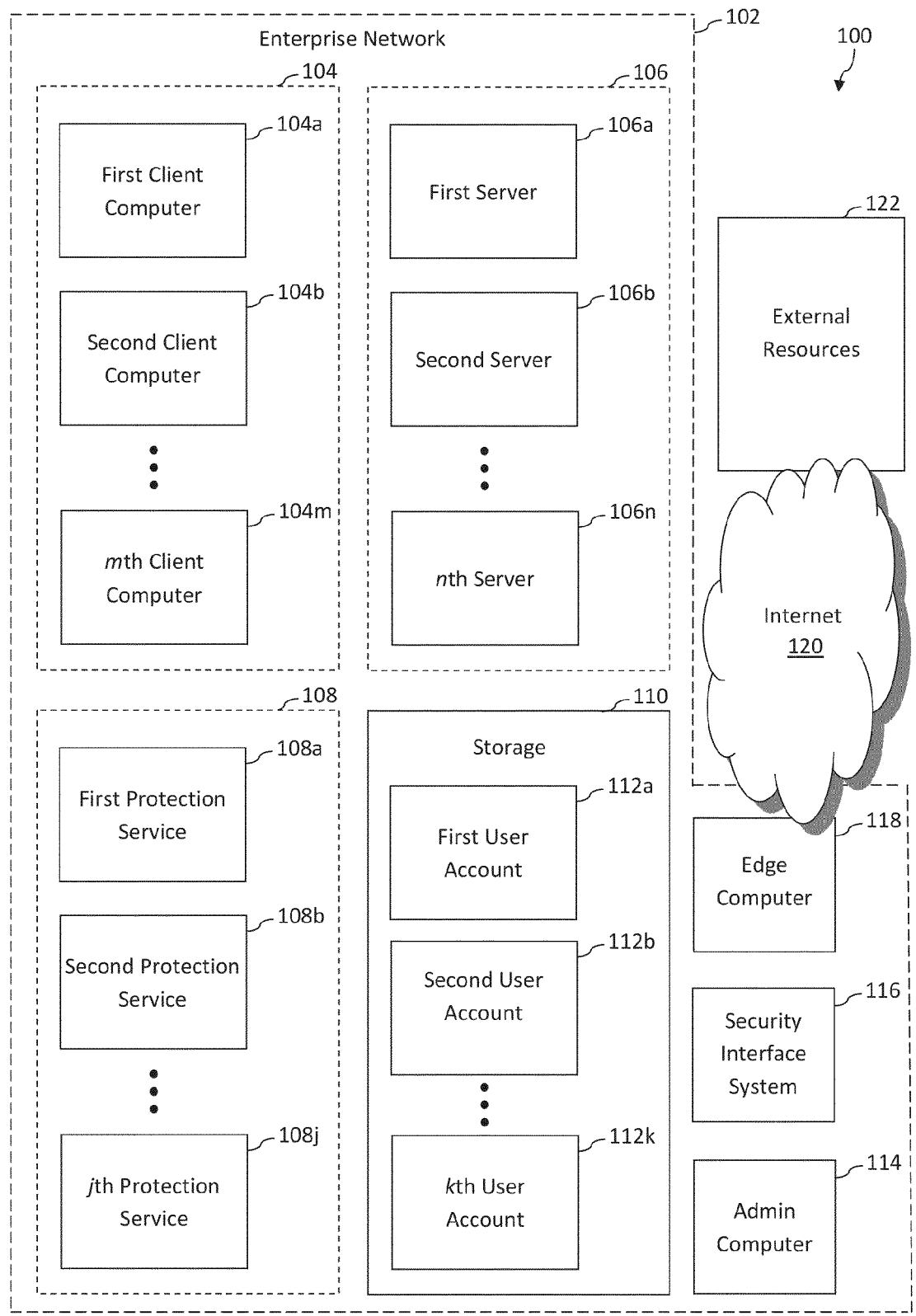
FIG. 1 is a block diagram of an example enterprise network environment in which embodiments of the present invention may be implemented.

FIG. 1 is a block diagram of an example enterprise network environment 100 in which embodiments of the present invention may be implemented. Enterprise network environment 100 includes an enterprise network 102, which is communicatively connected to external resources 122 via an external network such as the Internet 120 through an edge computer 118, such as a firewall or gateway. As shown in FIG. 1, edge computer 118 is utilized at the perimeter of enterprise network 102 to monitor traffic flowing between the Internet 120 and the IT assets and to block traffic that is suspicious. Example external resources 122 include but are not limited to websites, databases, file transfer protocol (FTP) sites, external e-mail servers, and the like.

Enterprise network 102 includes a plurality of client computers 104, a plurality of servers 106, a plurality of protection services 108 deployed among client computers 104 and servers 106, storage 110, administrative (admin) computer 114, security interface system 116, and edge computer 118. Client computers 104 are configured to enable users thereof to perform any of a variety of computing operations. A client computer 104 may be a desktop computer, a laptop computer, a pocket personal computer (PC), a personal digital assistant (PDA), and the like. Storage 110 stores user accounts 112a-112k for the respective users. For instance, user accounts 112a-112k may indicate privileges, preferences, etc. of the respective users.

Servers 106 are computers that are configured to perform system-level tasks with respect to enterprise network 102 and/or one or more client computers 104. Servers 106 may be configured to perform a variety of respective functions depending on the requirements of a particular implementation. For instance, servers 106 may include a domain controller configured to respond to authentication requests; a dynamic host configuration protocol (DHCP) server configured to assign network parameters to client computers 104 and other servers 106; a domain name system (DNS) server configured to govern DNS records such as host records, alias records, and mail exchange records for a domain name; a file server configured to provide storage of shared computer files that may be accessed by client computers 104; a Web server configured to provide hypertext markup language (HTML) documents (e.g., Web pages) and linked objects (e.g., images) in response to receiving hypertext transfer protocol (HTTP) requests from client computers 104; a simple mail transfer protocol (SMTP) server configured to relay email messages received from client computers 104 toward intended recipients, etc.

Protection services 108 are programs that are deployed among client computers 104, servers 106, and/or edge computer 118 (or implemented as software services provided from the Internet 120 or other networks) to monitor information technology (IT) assets for signs of problems, detect a malicious attack or the presence of any malware, and remediate the problems, for example by removing or disabling infected files to restore the affected IT asset to a pre-infected state. Each protection service 108a-108j may perform any of a variety of protection functions, such as edge firewall, anti-virus, network-based intrusion detection, host-based intrusion detection, etc. The particular choice of protection services 108 that may be deployed may vary by implementation.

It is emphasized that the term "IT assets" may be used to refer to client computers 104, servers 106, user accounts 112, edge computer 118, services, applications, enterprise network 102, or any combination thereof. The IT assets (e.g., client computers 104, servers 106, user accounts 112, edge computer 118, enterprise network 102 as a whole, etc.) can be subject to malicious attack over several attack vectors. A first example attack vector originates with external resources 122. For example, an external resource 122 may introduce malware to enterprise network 102 in the form of an attachment to an email that is directed to one or more of the client computers 104. In another example, a user of a client computer 104 may unsuspectingly download malware from a website supported by an external resource 122. A second example attack vector originates within enterprise network 102. For instance, disgruntled users or uninvited users may launch an attack directed at the IT assets and/or enterprise network 102 using client computers 104. A third example attack vector originates with client computers 104 that are taken outside the boundary of enterprise network 102. For instance, the client computers 104 may be infected with malware while outside enterprise network 102 and may introduce the malware to enterprise network 102 upon reentry thereto.

Administrator ("admin") computer 114 enables configuration and management of enterprise network 102, such as creating and maintaining user privileges and permissions; monitoring client computers 104, servers 106, edge computer 118, and network operations and resources; generating reports; setting policies for security and auditing; and the like.

Security interface system 116 is configured to provide a graphical interface element at admin computer 114 (or a client computer 104) that enables an administrative user to select a behavioral model to be associated with an IT asset, as described in further detail below with reference to example graphical interface elements 500 and 600 of respective FIGS. 5 and 6. Security interface system 116 may be further configured to provide a graphical interface element at admin computer 114 (or a client computer 104) that enables the administrative user to select a detection sensitivity to be associated with the IT asset, as described in further detail below with reference to example graphical interface element 900 of FIG. 9. Security interface system 116 may be further configured to provide a graphical interface element at admin computer 114 (or a client computer 104) that enables the administrative user to disable one or more protection rules of the plurality of protection rule configurations that are to be utilized by the respective protection services 108a-108j during respective malicious activity detection operations with respect to the IT asset, as described in further detail below with reference to example graphical interface elements 1000 and 1100 of respective FIGS. 10 and 11.

Figure 2:
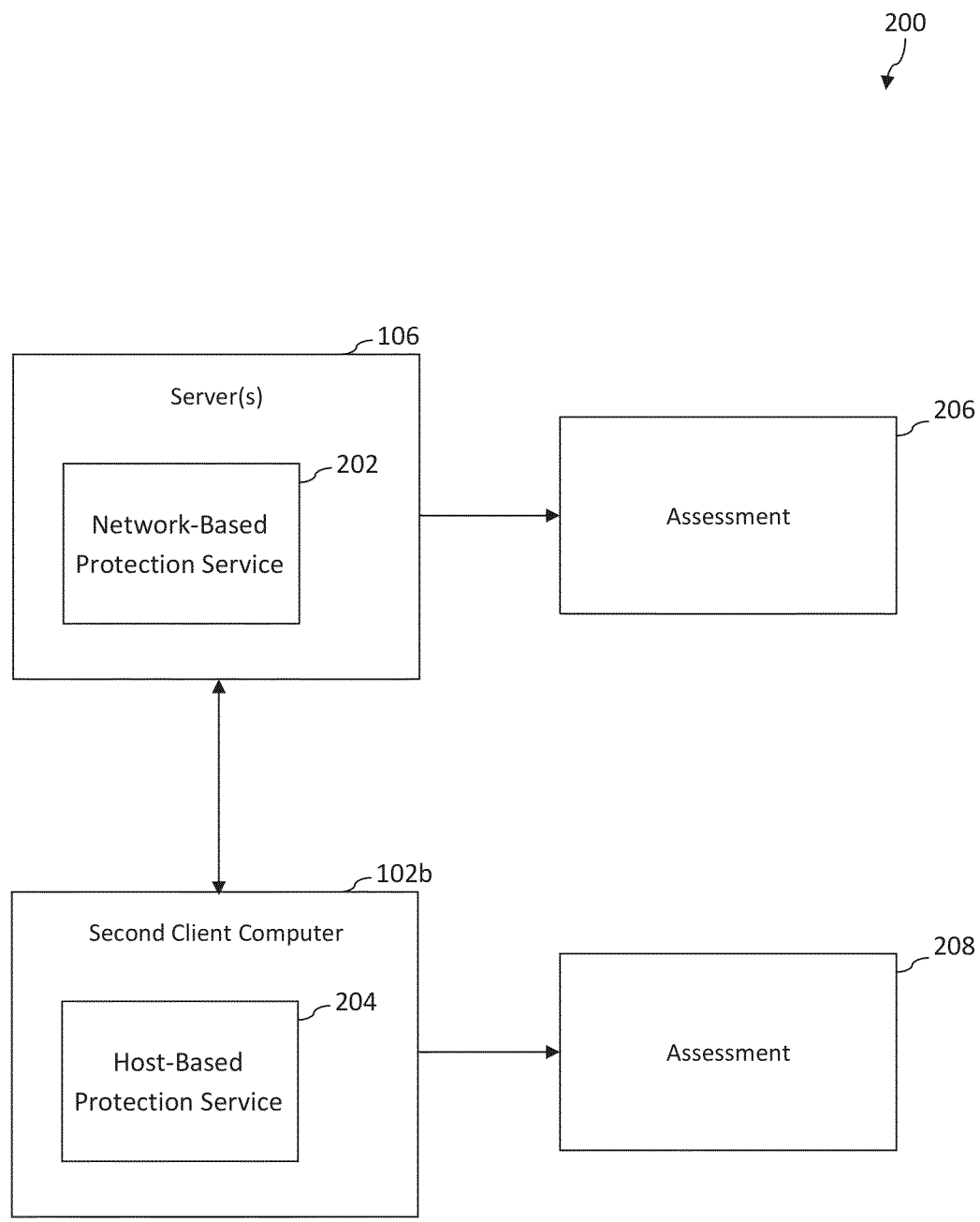
FIG. 2 shows an illustrative arrangement in which protection services in the enterprise network may monitor an information technology asset and generate respective assessments in accordance with an embodiment of the present invention.

Security interface system 116 may be further configured to provide a graphical interface element at admin computer 114 (or a client computer 104) that enables the system administrator to observe assessments of malicious activity that are generated by the respective protection services 108a-108j with respect to the IT asset based on the findings of the respective malicious activity detection operations. For instance, FIG. 2 shows an illustrative arrangement 200 in which protection services 108 in the enterprise network 102 may monitor an IT asset (second client computer 102b in this example) and generate respective assessments 206, 208 in accordance with an embodiment of the present invention As depicted in FIG. 2, protection services 108 may be configured as network-based protection services, such as network-based protection service 202 deployed on server(s) 106, or host-based protection services, such as host-based protection service 204 deployed on second client computer 102b. Network-based protection services perform network-level malicious activity detection operations; whereas, host-based protection services perform computer-level malicious activity detection operations.

For example, network-based protection services may comprise respective security gateway appliances providing security features such as unified threat management (UTM), edge (i.e., firewall) security, network access protection (NAP), security event management (SEM), security incident management (SIM), network intrusion detection (NID), identity management, operational health monitoring, host security, line-of-business security, web application protection, configuration management, and the like. These example network-based security features are provided for illustrative purposes and are not intended to be limiting. Persons skilled in the relevant art(s) will recognize that a network-based protection service may include any suitable type of appliance providing any suitable security feature(s). In some cases the security products can provide a discrete functionality, while in other cases various functionalities may be combined in a given protection service.

Host-based protection services, on the other hand, run partially or entirely as an application or process on an IT asset, such as second client computer 102b, as depicted in FIG. 2. Host-based protection service 204 is configured to monitor second client computer 102b, detect attacks and the presence of malware, and remediate the problems caused by the malicious activities or code.

In addition to performing the monitoring, detection, and remediation, network-based protection service 202 and host-based protection service 204 are further configured to generate respective assessments 206, 208 indicating the security state of monitored IT assets (second client computer 102b in this example).

Figure 3:
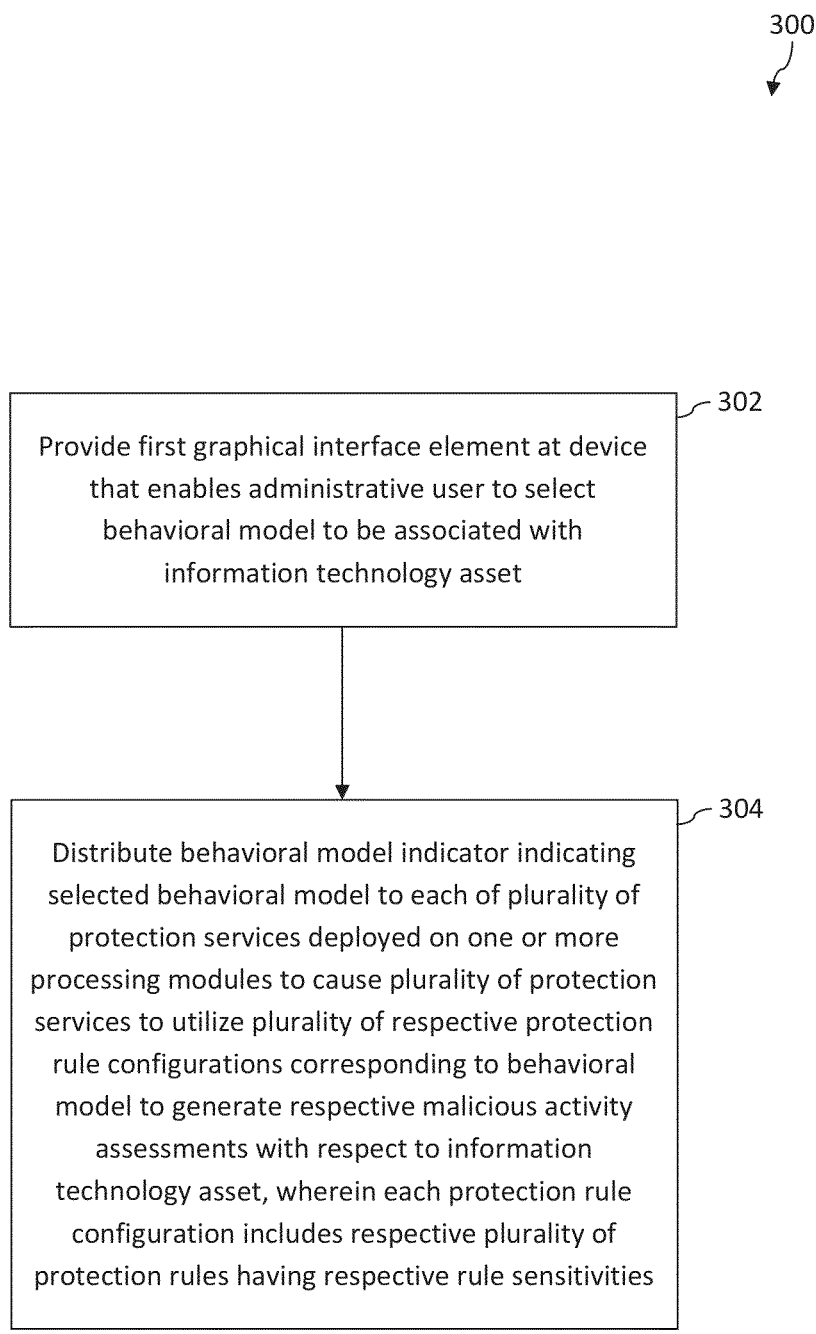
FIG. 3 depicts a flowchart of a method for controlling malicious activity detection in accordance with an embodiment of the present invention.
Figure 4:
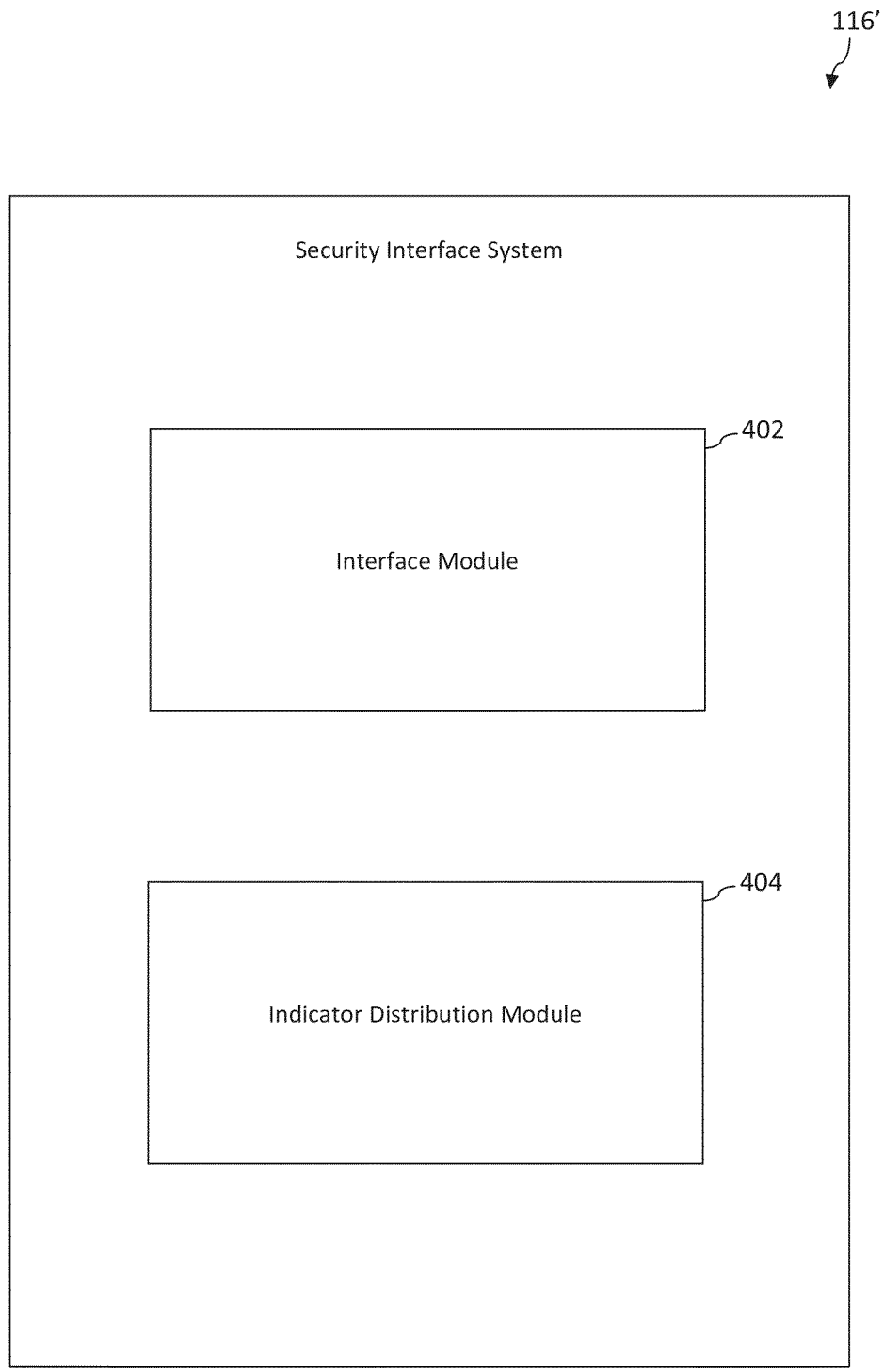
FIG. 4 is a block diagram of an example implementation of the security interface system shown in FIG. 1 in accordance with an embodiment of the present invention.

FIG. 3 depicts a flowchart of a method for controlling malicious activity detection in accordance with an embodiment of the present invention. Flowchart 300 may be performed by security interface system 116 of enterprise network 102 shown in FIG. 1, for example. For illustrative purposes, flowchart 300 is described with respect to a security interface system 116' shown in FIG. 4, which is an example of security interface system 116, according to an embodiment of the present invention. As shown in FIG. 4, security interface system 116' includes an interface module 402 and an indicator distribution module 404. Further structural and operational embodiments will be apparent to persons skilled in the relevant art(s) based on the discussion regarding flowchart 300. Flowchart 300 is described as follows.

As shown in FIG. 3, the method of flowchart 300 begins at step 302 in which a first graphical interface element is provided at a device that enables an administrative user to select a behavioral model to be associated with an information technology (IT) asset. In an example embodiment, interface module 402 of security interface system 116' provides the first graphical interface element at a device, such as admin computer 114 or a client computer 104.

At step 304, a behavioral model indicator indicating the selected behavioral model is distributed to each of a plurality of protection services. The protection services are deployed on one or more processing modules (e.g., one or more client computers 104 and/or servers 106) to cause the plurality of protection services to utilize a plurality of respective protection rule configurations to generate respective malicious activity assessments with respect to the IT asset. The protection rule configurations correspond to the behavioral model. Each protection rule configuration includes a respective plurality of protection rules having respective rule sensitivities. In an example embodiment, indicator distribution module 404 of security interface system 116' distributes the behavioral model indicator to the protection services, such as protection services 108a-108j.

In an example implementation, the first graphical interface element may enable the administrative user to select a plurality of behavioral models to be associated with the IT asset. In accordance with this example implementation, the behavioral model indicator may indicate the selected plurality of behavioral models to each of the plurality of protection services to cause the plurality of protection services to utilize respective protection rule configurations corresponding to a combination of the selected behavioral models to generate the respective malicious activity assessments. Further description of an example graphical interface element that is capable of facilitating this example implementation is provided below with reference to graphical interface element 500 of FIG. 5.

In another example implementation, a second graphical interface element may be provided that enables the administrative user to select a detection sensitivity to be associated with the IT asset. In accordance with this example implementation, a detection sensitivity indicator indicating the selected detection sensitivity may be distributed to each of the plurality of protection services to cause the plurality of protection services to utilize the plurality of respective protection rule configurations that further correspond to the detection sensitivity to generate the respective malicious activity assessments with respect to the IT asset. Further description of an example graphical interface element that is capable of facilitating this example implementation is provided below with reference to graphical interface element 900 of FIG. 9.

In yet another example implementation, a second graphical interface element may be provided that enables the administrative user to disable one or more protection technology sets. Each protection technology set including at least two respective protection rules of the plurality of protection rule configurations. In accordance with this example implementation, a disablement indicator indicating the disabled one or more protection technology sets may be distributed to each of the plurality of protection services to cause the plurality of protection services to not include the disabled one or more protection sets when generating the respective malicious activity assessments with respect to the IT asset. Further description of example graphical interface elements that are capable of facilitating this example implementation is provided below with reference to graphical interface elements 1100 and 1200 of respective FIGS. 11 and 12.

In still another example implementation, a second graphical interface element may be provided that enables the administrative user to disable each protection rule of the plurality of protection rule configurations independently. In accordance with this example implementation, a disablement indicator indicating disabled protection rules may be distributed to each of the plurality of protection services to cause the plurality of protection services to not include the disabled protection rules when generating the respective malicious activity assessments with respect to the IT asset. Further description of an example graphical interface element that is capable of facilitating this example implementation is provided below with reference to graphical interface element 1300 of FIG. 13.

Figure 5:
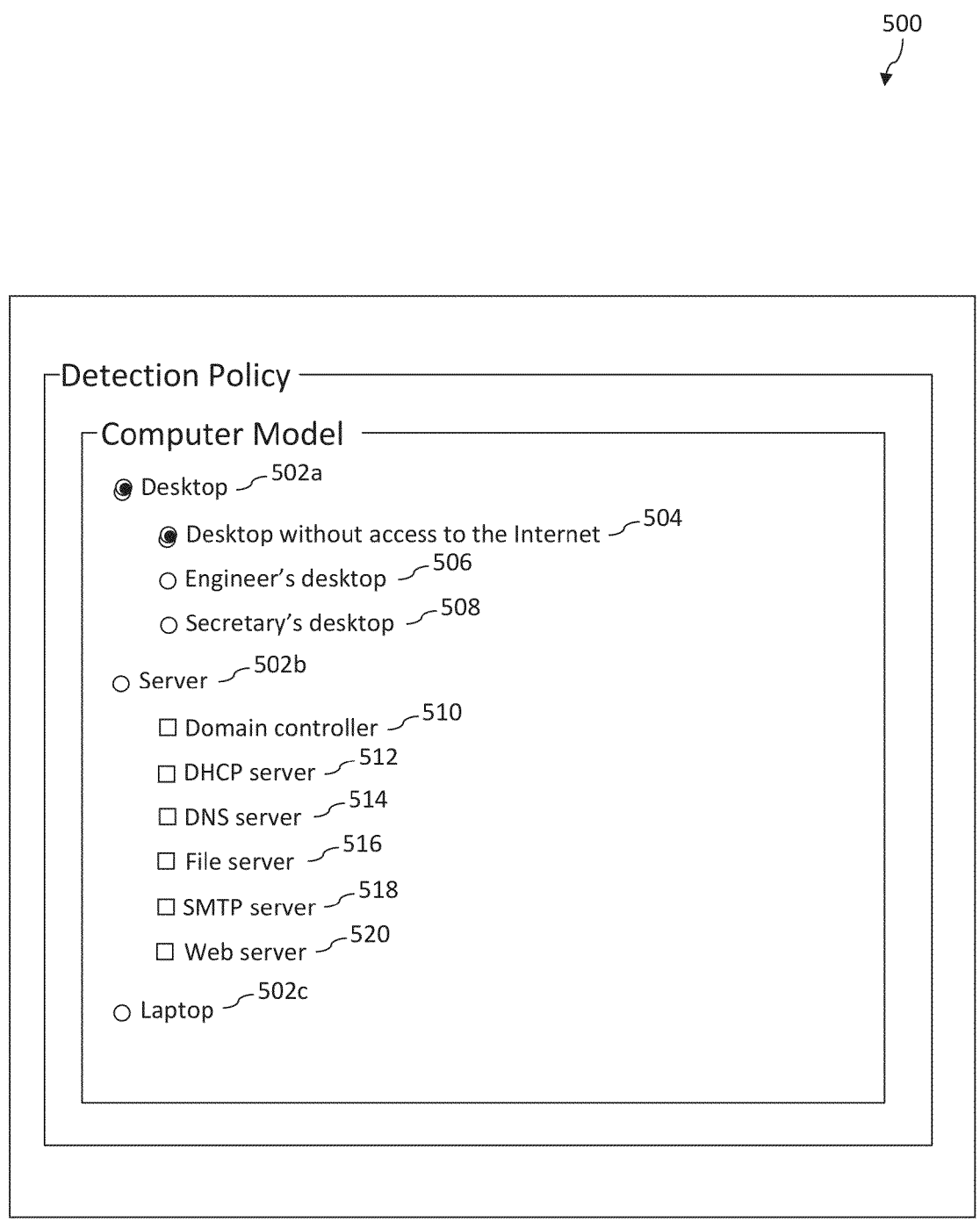
FIG. 5 is an illustration of an example graphical interface element for enabling the selection of behavioral model(s) with respect to computer(s) in accordance with an embodiment of the present invention.

FIG. 5 is an illustration of an example graphical interface element 500 for enabling the selection of behavioral model(s) with respect to computer(s) in accordance with an embodiment of the present invention. For example, graphical interface element 500 may be generated by security interface system 116 and displayed to an administrative user at admin computer 114. Graphical interface element 500 enables the administrative user to associate computer behavioral models 502-520 with one or more computers, such as client computers 104 and/or servers 106.

The administrative user may select one of a plurality of categories 502a-502c. Desktop category 502a includes computer behavioral models 504, 506, and 508. Server category 502b includes computer behavioral models 510, 512, 514, 516, 518, and 520. Laptop category 502c is itself a computer behavioral model because additional models are not associated with laptop 502c. Within desktop category 502a, the administrative user may select one of computer models 504, 506, or 508. Within server category 502b, the administrative user may select any one or more of computer behavioral models 510, 512, 514, 516, 518, and/or 520. For instance, a server 106 may be configured to include a plurality of server functionalities.

Associating behavioral model(s) with the one or more computers indicates to protection services 108 which respective protection rule configurations to use for detecting malicious activity with respect to the one or more computers. Each protection rule configuration includes a respective plurality of protection rules and corresponding sensitivities that are indicative of the behavioral model(s) associated with the one or more computers. Some example protection rules are described in further detail below with reference to tables 700 and 800 of respective FIGS. 7 and 8.

A computer 104, 106 may be given certain permissions and/or have an expected behavior based on its function in enterprise network 102. For example, an engineer's desktop, which is represented by computer behavioral model 506, may have different permissions and/or expected behavior than an SMTP server, which is represented by computer behavioral model 518. In another example, an SMTP server may have different permissions and/or expected behavior than a Web server, which is represented by computer behavioral model 520.

A Web server answers HTTP queries on port 80 (or 8080) and rarely answers file transfer protocol (FTP) queries on port 21. Thus, if a protection service 108 is configured to detect malicious activity in accordance with Web server behavioral model 520, and protection service 108 observes FTP traffic coming from a computer that is associated with Web server behavioral model 520, protection service 108 includes an indication of the observation when it generates its malicious activity assessment.

An SMTP server initiates connections with other SMTP servers using destination port 25 and rarely answers Web queries. Thus, if a protection service 108 is configured to detect malicious activity in accordance with SMTP server behavioral model 518, and protection service 108 observes Web traffic coming from a computer that is associated with SMTP server behavioral model 518, protection service 108 includes an indication of the observation when it generates its malicious activity assessment.

As depicted in FIG. 2, computer behavioral model 502 is selected for illustrative purposes, indicating that the one or more computers are desktop computers that do not have access to the Internet. Responsive to determining that computer behavioral model 502 has been associated with the one or more computers, protection services 108 apply only those protection rules included in the respective protection rule configurations corresponding to computer behavioral model 502 when detecting malicious activity with respect to the one or more computers.

In a first example implementation, protection services 108 may apply the protection rules during an analysis of information that has been collected by the respective protection services 108, rather than during collection of the information. In accordance with this implementation, protection services may collect the information in accordance with a protocol that is independent from selected behavioral model(s) during a malicious activity detection operation.

In a second example implementation, protection services 108 apply the protection rules to determine which information to collect with respect to the one or more computers. In accordance with this implementation, information is not collected with regard to protection rules that are not included in the protection rule categorizations that correspond to the selected behavioral model(s).

Figure 6:
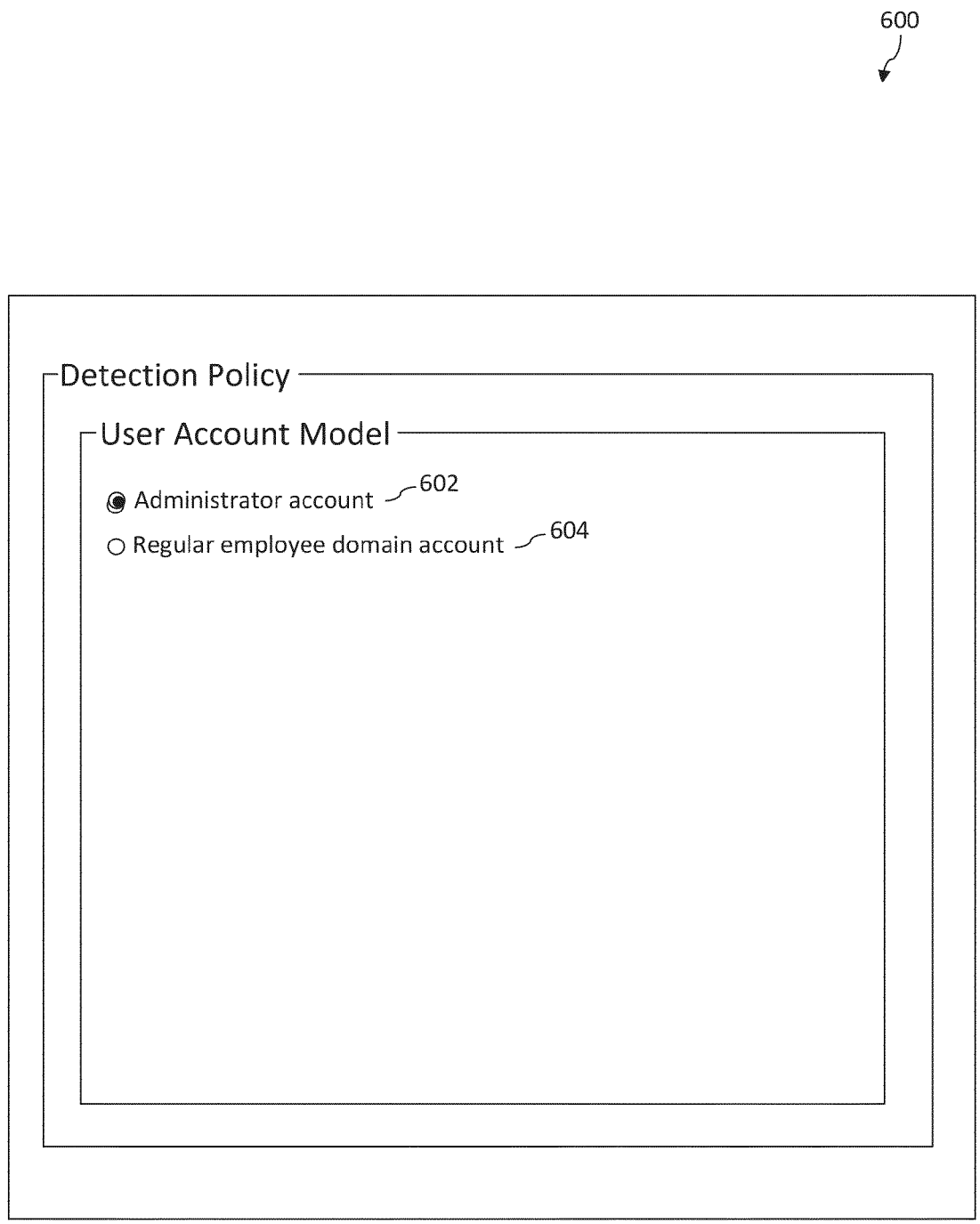
FIG. 6 is an illustration of an example graphical interface element for enabling the selection of a behavioral model with respect to user account(s) in accordance with an embodiment of the present invention.

FIG. 6 is an illustration of an example graphical interface element 600 for enabling the selection of a behavioral model with respect to user account(s) in accordance with an embodiment of the present invention. Graphical interface element 600 enables the administrative user to associate a user account behavioral model 602 or 604 with one or more user accounts, such as user accounts 112a-112k. As depicted in FIG. 6, the administrative user may select either administrator account model 602 or regular employee domain account model 604. Two example user account models 602, 604 are shown for illustrative purposes and are not intended to be limiting. It will be recognized by persons skilled in the relevant art(s) that graphical interface element 600 may enable selection of any number of user account models.

Administrator account model 602 may have more permissions and/or a less restrictive expected behavior than regular employee domain account model 604, though the scope of the present invention is not limited in this respect. For instance, regular employee domain account model 604 may apply to all users who do not have administrator privileges. A domain account may be expected to be logged into two or three computers that are used for day-to-day work. The domain account may not be expected for a user of a user account to modify confidential information in a human resources (HR) database, however. Thus, if a protection service 108 is configured to detect malicious activity in accordance with regular employee domain account model 604, and protection service 108 observes a user account that is associated with regular employee domain account model 604 accessing the HR database, protection service 108 memorializes the observation in its malicious activity assessment.

FIGS. 7 and 8 show respective tables 700 and 800 of some example protection rules and respective functionalities in accordance with embodiments of the present invention. The first and second example protection rules listed in table 700 are illustrative of rules that may be applied by network-based protection services during a malicious activity detection operation; whereas, the third example protection rules listed in table 800 are illustrative of rules that may be applied by host-based protection services during a malicious activity detection operation, though the scope of the present invention is not limited in this respect.

For instance, the first example protection rules may be run on a threat management gateway server (e.g., a firewall server). The second example protection rules may be run on a central management server. The third example protection rules may be run on each host (e.g., each client computer 104 and server 106 of enterprise network 102). The example protection rules listed in tables 700 and 800 are provided for illustrative purposes and are not intended to be limiting. Moreover, a protection service that applies the first and/or second example protection rules of table 700 need not necessarily be network-based, and a protection service that applies the third example protection rules of table 800 need not necessarily be host-based. For instance, a host-based protection service may apply the first and/or second example protection rules, and a network-based protection service may apply the third example protection rules.

Figure 9:
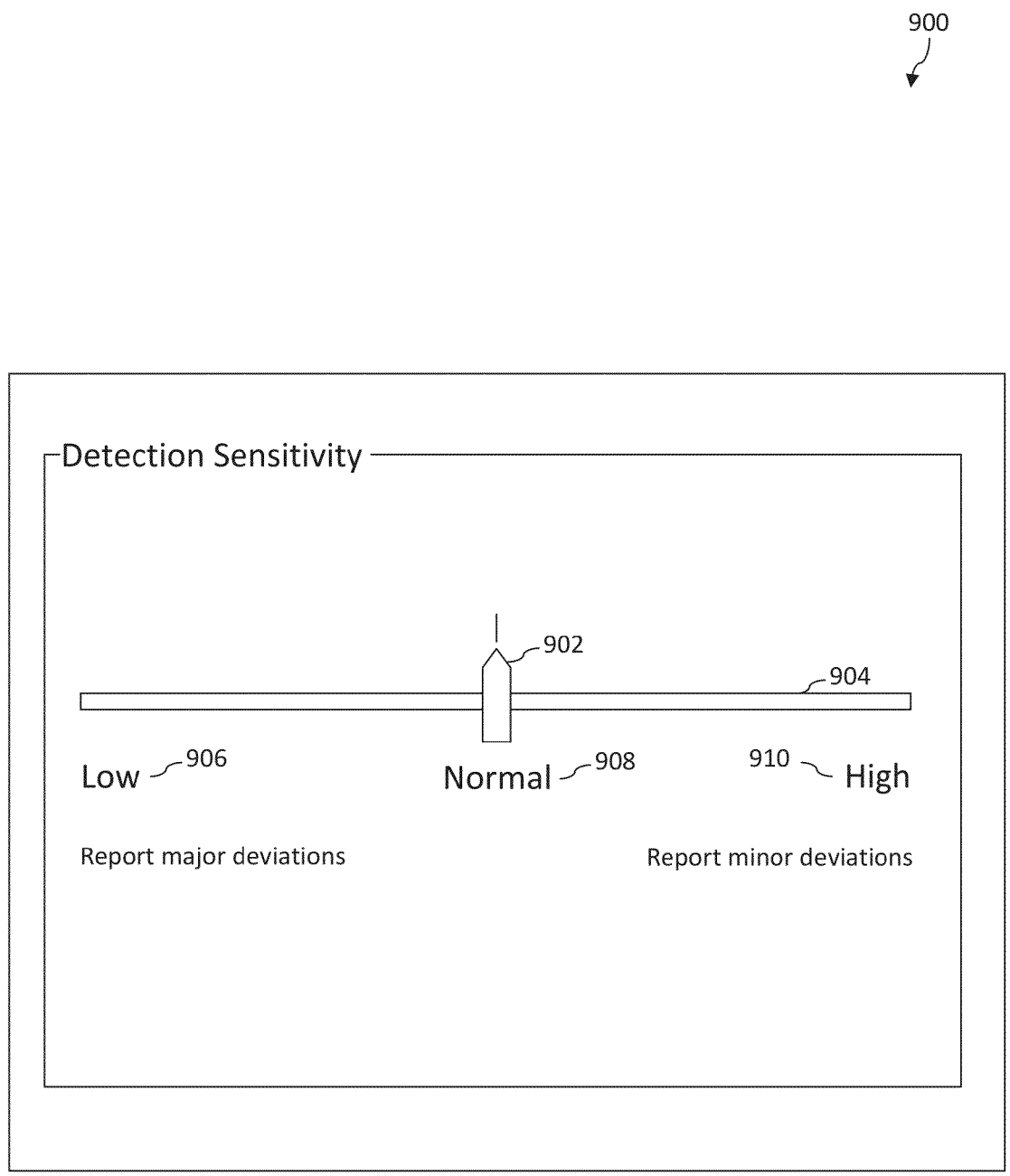
FIG. 9 is an illustration of an example graphical interface element for enabling the selection of a detection sensitivity to be associated with an information technology asset in accordance with an embodiment of the present invention.

FIG. 9 is an illustration of an example graphical interface element for enabling the selection of a detection sensitivity to be associated with an IT asset in accordance with an embodiment of the present invention. For instance, protection rule configurations utilized by respective protection services 108 include protection rules that are associated with respective sensitivities (e.g., default sensitivities) based on behavioral model(s) associated with an IT asset. An administrative user may change the sensitivities associated with the respective protection rules by changing the detection sensitivity associated with the IT asset. The detection sensitivity may be related to the criticality of the IT asset, though the scope of the embodiments is not limited in this respect.

The administrative user may move pointer 902 along slider 904 to select the desired detection sensitivity for the IT asset. For example, when a user experiences too many false assessments (e.g., false indications of malicious activity) coming from an IT asset associated with a behavioral model, though the correct behavioral model seems to have been selected, an administrative user (or the user herself) may decrease the overall sensitivity of the behavioral model by selecting a low detection sensitivity 906. Accordingly, the sensitivities associated with the respective protection rules associated with the behavioral model are decreased. In accordance with this example, protection services 108 report major deviations with respect to activity or behavior associated with the IT asset.

In further illustration of this example, assume that a SPAM detection rule is associated with a behavioral model that is associated with an IT asset. The sensitivity of the SPAM detection rule may be initially set to detect malicious activity with respect to the IT asset when a user sends ten or more emails within the last minute. The sensitivity of the SPAM detection rule may be decreased in accordance with the selection of low detection sensitivity 906 to detect malicious activity when the user sends twenty or more emails within the last minute.

In another example, selecting a normal detection sensitivity 908 causes the sensitivities associated with the respective protection rules to not be changed from their initial settings.

In yet another example, selecting a high detection sensitivity 910 causes the sensitivities associated with the respective protection rules to be increased. In accordance with this example, protection services 108 report even minor deviations with respect to activity or behavior associated with the IT asset. For instance, high detection sensitivity 910 may be selected when the initial sensitivities associated with the respective protection rules are such that some instances of malicious activity are going undetected.

Any modified behavioral model, such a behavioral model that is modified in accordance with a selected detection sensitivity as described above, may be saved in storage 110, for example, as a policy, which may then be associated with one or more computers as a newly defined behavioral model.

FIG. 10 shows a table of some example protection rules 1002 and respective sensitivities 1004 based on selectable detection sensitivities 906, 908, 910 that may be associated with an IT asset based on a selected behavioral model in accordance with an embodiment of the present invention. For example, if the administrative user selects low detection sensitivity 906 of FIG. 11 to be associated with an IT asset, the SPAM detection, click fraud, and bot access protection rules are disabled, and the outbound bandwidth protection rule is applied in accordance with a designated high threshold (assuming the outbound bandwidth protection rule is enabled with respect to the IT asset). If the administrative user selects normal detection sensitivity 908, the SPAM detection, click fraud, outbound bandwidth, and bot access protection rules are applied in accordance with respective designated middle thresholds (assuming these protection rules are enabled with respect to the IT asset). If the administrative user selects high detection sensitivity 910, the aforementioned protection rules are applied in accordance with respective designated low thresholds (assuming these protection rules are enabled with respect to the IT asset).

The low, middle, and high thresholds for each protection rule may be established by an administrative user, for example. Table 1000 may include different protection rules and reflect different sensitivities for different behavioral models.

Figure 11:
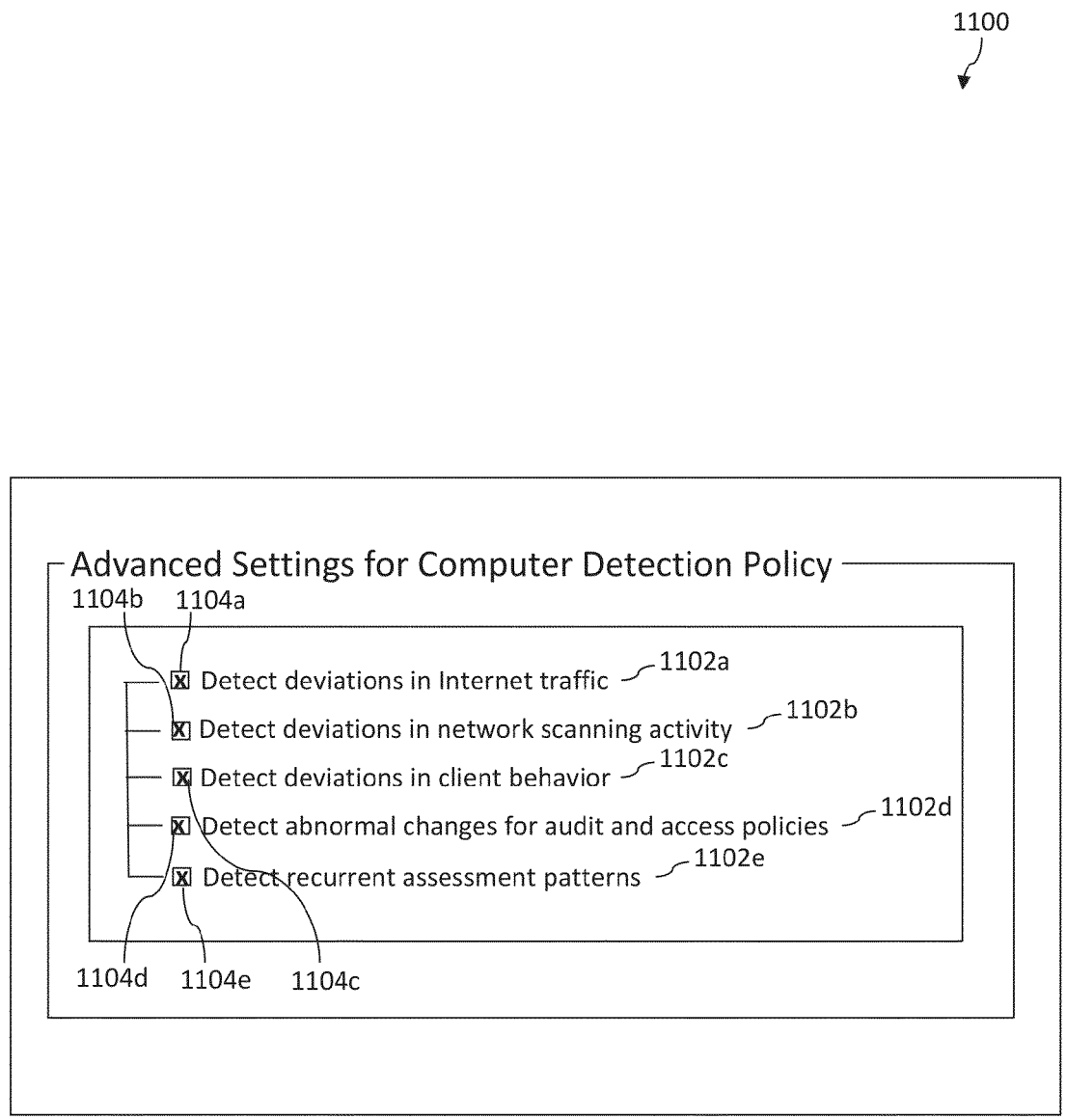
FIG. 11 is an illustration of an example graphical interface element for enabling the disablement of one or more protection technology sets with respect to a computer in accordance with an embodiment of the present invention.

FIG. 11 is an illustration of an example graphical interface element 1100 for enabling the disablement of one or more protection technology sets 1102 with respect to a computer in accordance with an embodiment of the present invention. Each protection technology set 1102a, 1102b, 1102c, 1102d, and 1102e includes a respective plurality of protection rules. An administrative user may deselect a checkbox 1104a, 1104b, 1104c, 1104d, or 1104e corresponding to a respective protection technology set 1102a, 1102b, 1102c, 1102d, or 1102e to disable the protection rules that are included in that protection technology set.

As depicted in FIG. 11, deselecting checkbox 1104a disables protection rules that are directed to detecting deviations in Internet traffic. Deselecting checkbox 1104b disables protection rules that are directed to detecting deviations in network scanning activity. Deselecting checkbox 1104c disables protection rules that are directed to detecting deviations in client behavior. Deselecting checkbox 1104d disables protection rules that are directed to detecting abnormal changes for audit and access policies. Deselecting checkbox 1104e disables protection rules that are directed to detecting recurrent assessment patterns. Protection technology sets 1102a, 1102b, 1102c, 1102d, and 1102e are provided for illustrative purposes and are not intended to be limiting. Graphical interface element 1100 may be configured to provide any suitable protection technology sets for selection and/or de-selection.

Figure 12:
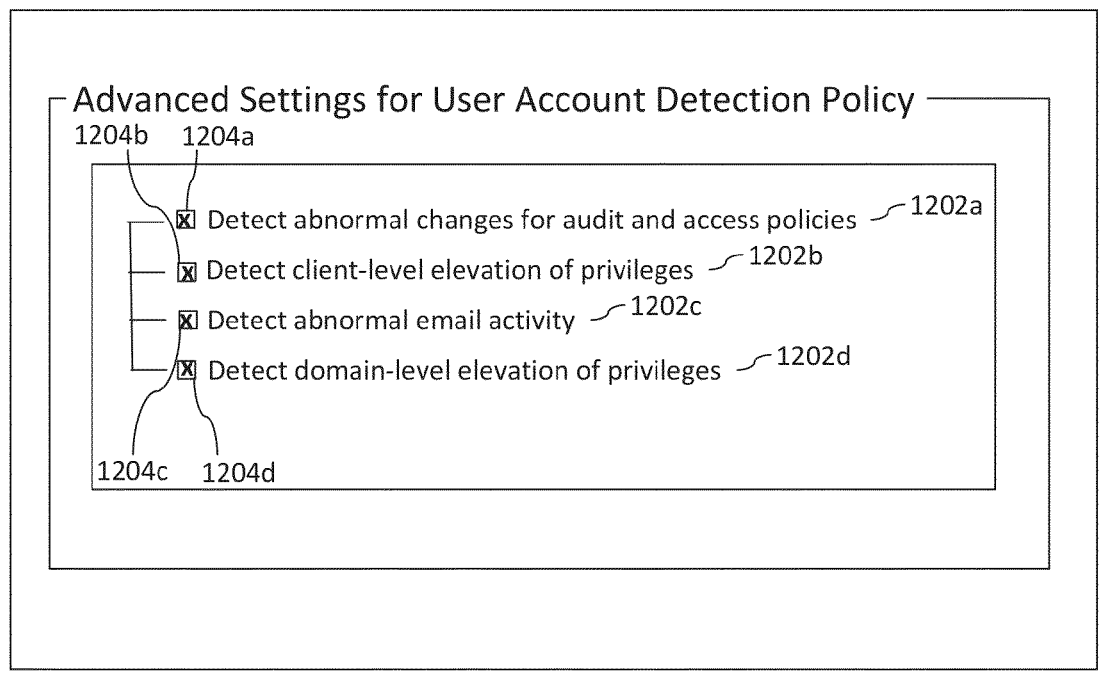
FIG. 12 is an illustration of an example graphical interface element for enabling the disablement of one or more protection technology sets with respect to a user account in accordance with an embodiment of the present invention.

FIG. 12 is an illustration of an example graphical interface element 1200 for enabling the disablement of one or more protection technology sets 1202 with respect to a user account in accordance with an embodiment of the present invention. Each protection technology set 1202a, 1202b, 1202c, and 1202d includes a respective plurality of protection rules. An administrative user may deselect a checkbox 1204a, 1204b, 1204c, or 1204d corresponding to a respective protection technology set 1202a, 1202b, 1202c, or 1202d to disable the protection rules that are included in that protection technology set.

As depicted in FIG. 12, deselecting checkbox 1204a disables protection rules that are directed to detecting abnormal changes for audit and access policies. Deselecting checkbox 1204b disables protection rules that are directed to detecting client-level elevation of privileges. Deselecting checkbox 1204c disables protection rules that are directed to detecting abnormal email activity. Deselecting checkbox 1204d disables protection rules that are directed to detecting domain-level elevation of privileges. Protection technology sets 1202a, 1202b, 1202c, and 1202d are provided for illustrative purposes and are not intended to be limiting. Graphical interface element 1200 may be configured to provide any suitable protection technology sets for selection and/or de-selection.

Figure 13:
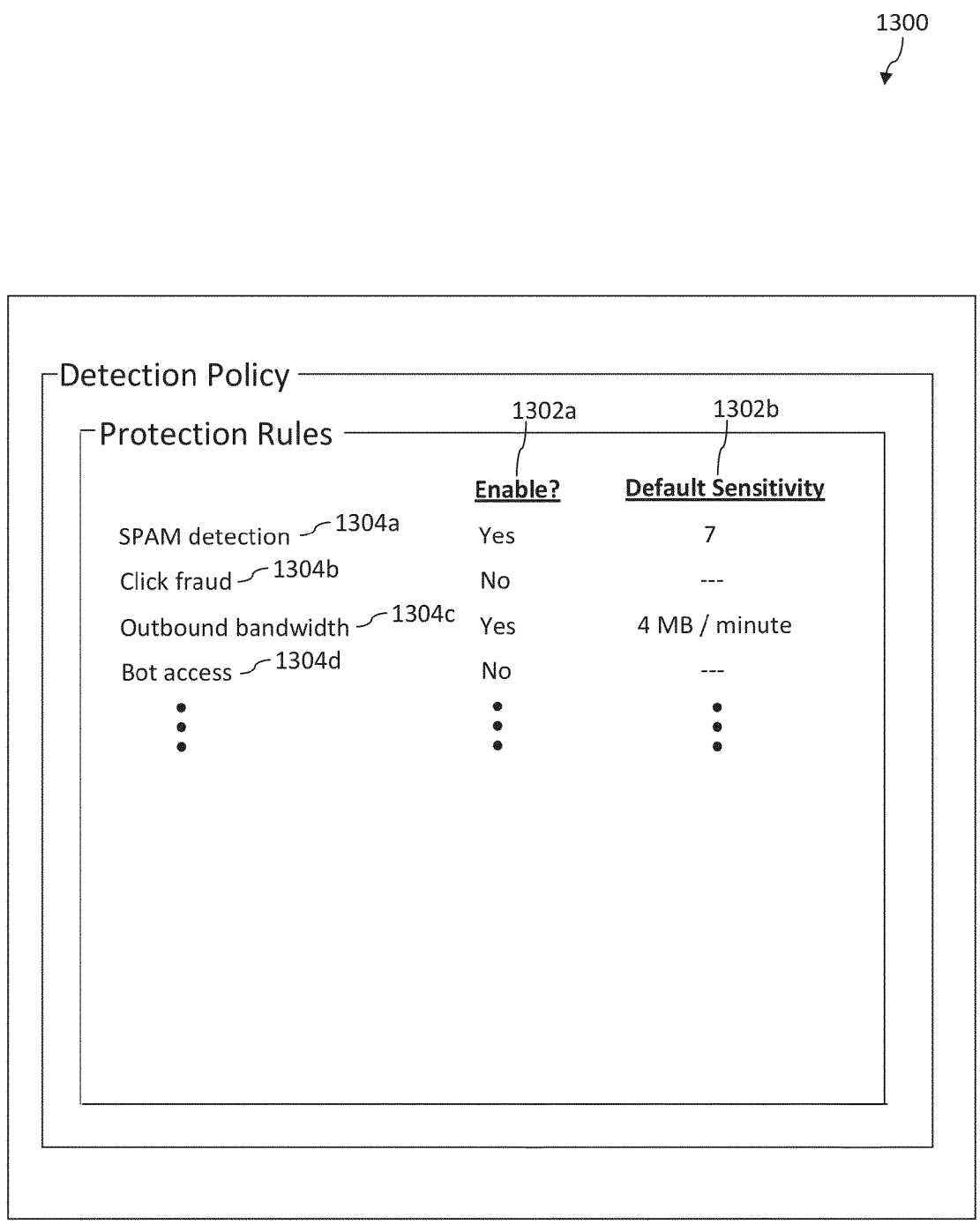
FIG. 13 is an illustration of an example graphical interface element for enabling the selection of settings for each of a plurality of protection rules independently in accordance with an embodiment of the present invention.

FIG. 13 is an illustration of an example graphical interface element 1300 for enabling the selection of settings for each of a plurality of protection rules independently in accordance with an embodiment of the present invention. As depicted in FIG. 13, an administrative user may select an enablement setting 1302a and a default sensitivity setting 1302b for any one or more of the protection rules.

SPAM detection protection rule 1304a is shown to be enabled with a default sensitivity of 7 on a ten-point scale, though any suitable scale may be used. Outbound bandwidth protection rule 1304c is shown to be enabled with a default sensitivity of 4 megabytes (MB) per minute. Click fraud protection rule 1304b and bot access protection rule 1304d are each shown to be disabled. Accordingly, no default sensitivity is associated with click fraud protection rule 1304b and bot access protection rule 1304d. The administrative user may change the enablement setting 1302a and/or the default sensitivity setting 1302b associated with any one or more protection rules independently from the settings for the other protection rules.

Figure 14:
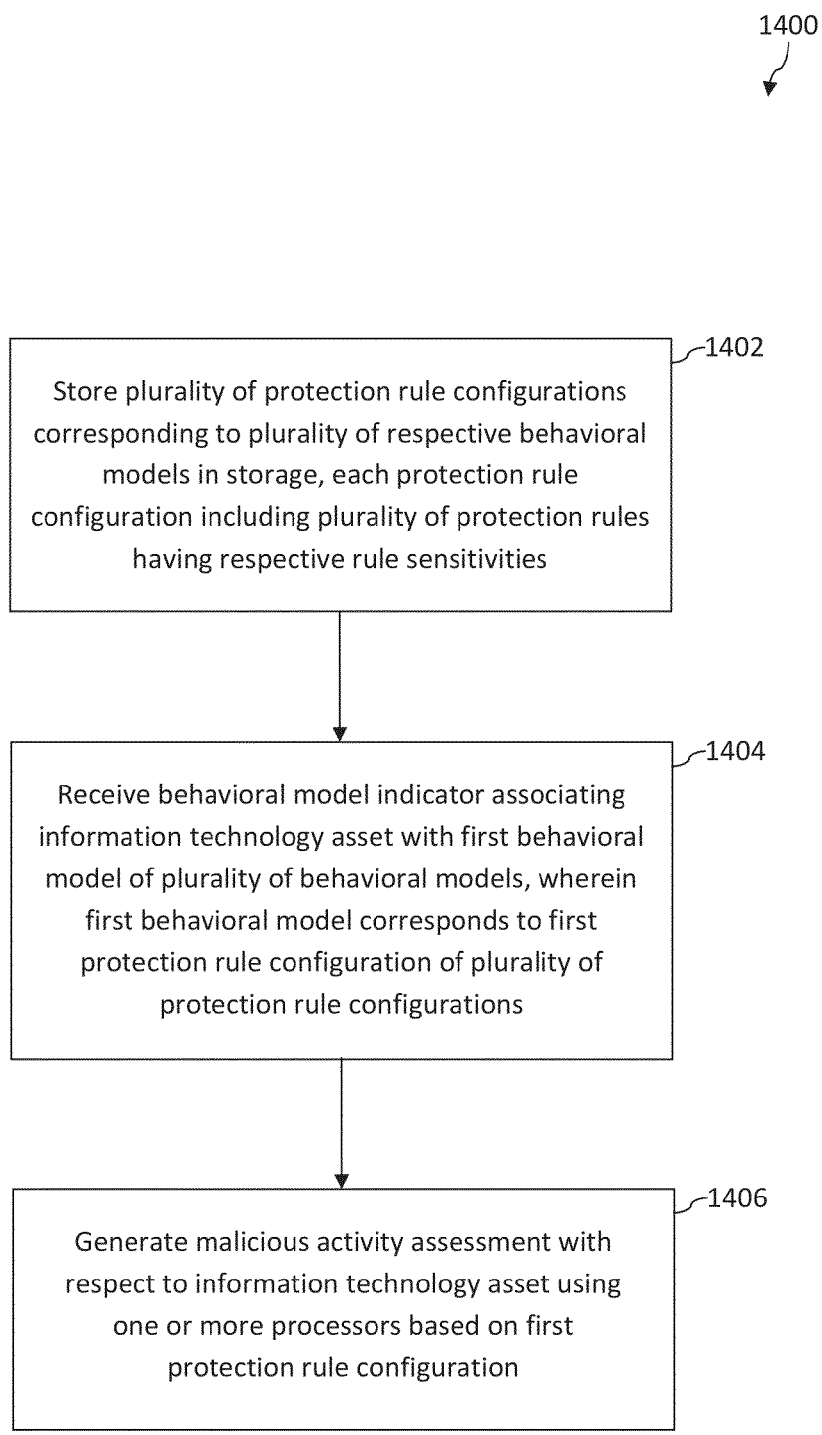
FIG. 14 depicts a flowchart of a method for generating a malicious activity assessment in accordance with an embodiment of the present invention.
Figure 15:
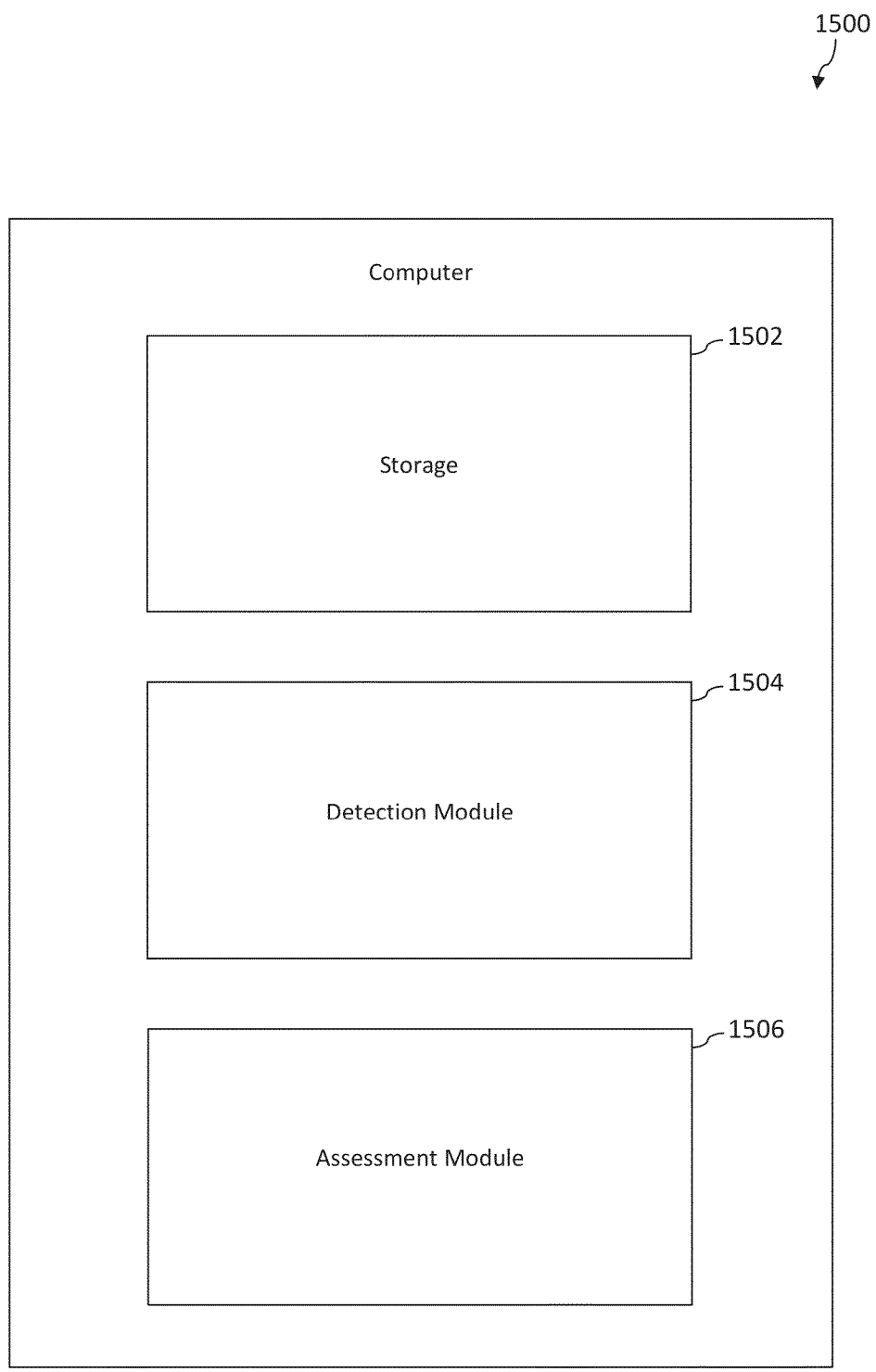
FIG. 15 is a block diagram of an example implementation of a computer in accordance with an embodiment of the present invention.

FIG. 14 depicts a flowchart of a method for generating a malicious activity assessment in accordance with an embodiment of the present invention. Flowchart 1400 may be performed by a protection service 108 deployed on a computer, such as a client computer 104 or a server 106 of enterprise network 102 shown in FIG. 1, for example. For illustrative purposes, flowchart 1400 is described with respect to a computer 1500 shown in FIG. 15, which is an example implementation of a computer, according to an embodiment of the present invention. As shown in FIG. 15, computer 1500 includes storage 1502, a detection module 1504, and an assessment module 1506. Further structural and operational embodiments will be apparent to persons skilled in the relevant art(s) based on the discussion regarding flowchart 1400. Flowchart 1400 is described as follows.

As shown in FIG. 14, the method of flowchart 1400 begins at step 1402 in which a plurality of protection rule configurations corresponding to a plurality of respective behavioral models are stored in a storage. Each protection rule configuration includes a plurality of protection rules having respective rule sensitivities. For instance, storage 1502 of computer 1500 may store the plurality of protection rule configurations.

At step 1404, a behavioral model indicator associating an information technology (IT) asset with a first behavioral model of the plurality of behavioral models is received. The first behavioral model corresponds to a first protection rule configuration of the plurality of protection rule configurations. For example, detection module 1504 may detect the behavioral model indicator. The behavioral model indicator may be received from indicator distribution module 404 of security interface system 116' of FIG. 4, for example, though the scope of the present invention is not limited in this respect.

At step 1406, a malicious activity assessment is generated with respect to the IT asset using one or more processors based on the first protection rule configuration. For instance, assessment module 1506 may generate the malicious activity assessment. Assessment module 1506 may include the one or more processors in an example implementation.

FIG. 16 depicts an exemplary implementation of a computer 1600 in which embodiments of the present invention may be implemented. Any one or more of the client computers 104, servers 106, admin computer 114, or security interface system 116 shown in FIG. 1, or computer 1500 shown in FIG. 15 may be implemented similarly to computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments of the present invention may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing protection services 108, security interface system 116, interface module 402, indicator distribution module 404, detection module 1504, assessment module 1506, flowchart 300 (including any step of flowchart 300), and/or flowchart 1400 (including any step of flowchart 1400), as described herein.

A user may enter commands and information into the computer 1600 through input devices such as keyboard 1638 and pointing device 1640. Other input devices (not shown) may include a microphone, joystick, game pad, satellite dish, scanner, or the like. These and other input devices are often connected to the processing unit 1602 through a serial port interface 1642 that is coupled to bus 1606, but may be connected by other interfaces, such as a parallel port, game port, or a universal serial bus (USB).

A monitor 1644 or other type of display device is also connected to bus 1606 via an interface, such as a video adapter 1646. In addition to the monitor, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable medium" are used to generally refer to media such as the hard disk associated with hard disk drive 1614, removable magnetic disk 1618, removable optical disk 1622, as well as other media such as flash memory cards, digital video disks, random access memories (RAMs), read only memories (ROM), and the like.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments of the present invention discussed herein. Accordingly, such computer programs represent controllers of the computer 1600.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Embodiments described herein have a variety of benefits, as compared to conventional malicious activity detection techniques. For example, embodiments may advantageously enable a user to select behavioral model(s) to be associated with an IT asset, so that protection services may apply protection rules and associated sensitivities based on the selected behavioral rule(s), rather than requiring the user to review a list of available protection rules and sensitivities. For instance, embodiments may eliminate the need for the user to determine which protection rules and associated sensitivities should be applied during a malicious activity detection operation. Rather, the user need only select one behavioral model (or more if desired), which is used by the protection services to determine which protection rules and sensitivities to apply during malicious activity detection operations with respect to that IT asset.

Embodiments distribute the behavioral model to a plurality of protection services, so that each protection service may determine which of the plurality of protection rules and associated sensitivities are to be applied during an operation performed by the respective protection service.

Embodiments enable the detection sensitivity associated with the IT asset as a whole to be increased or decreased. For instance, the sensitivities of the respective protection rules associated with a selected behavioral model may be increased by selecting a relatively high detection sensitivity for the IT asset. Similarly, the sensitivities of the respective protection rules may be decreased by selecting a relatively low detection sensitivity for the IT asset.

A plurality of protection rules (referred to herein as a "protection technology set") may be enabled or disabled by respectively selecting or deselecting a single indicator associated with the plurality of protection rules. Each protection rule may be enabled or disabled independently from the other protection rules. The sensitivity of each protection rule may be selected independently from the other protection rules.

III. Conclusion

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of controlling malicious activity detection, comprising:
   displaying a first graphical interface element at a presentation device that enables a user to select a behavioral model to be associated with an information technology asset; and
   causing distribution of a behavioral model indicator indicating the selected behavioral model to a plurality of protection services deployed on one or more processing modules, the behavioral model indicating a plurality of protection rule configurations to be applied by the plurality of respective protection services during a plurality of operations that are to be performed by the plurality of respective protection services, each protection rule configuration including one or more protection rules selected from a plurality of protection rules, each protection rule indicating respective information to be collected with respect to the information technology asset for generation of a respective malicious activity assessment with respect to the information technology asset.

2. The method of claim 1, wherein displaying the first graphical interface element comprises:
   displaying the first graphical interface element that enables the user to select a behavioral model to be associated with a computer.

3. The method of claim 1, wherein displaying the first graphical interface element comprises:
   displaying the first graphical interface element that enables the user to select a behavioral model to be associated with a user account.

4. The method of claim 1, wherein displaying the first graphical interface element includes displaying the first graphical interface element that enables the user to select a plurality of behavioral models to be associated with the information technology asset; and
   wherein causing distribution of the behavioral model indicator includes causing distribution of the behavioral model indicator indicating the selected plurality of behavioral models to the plurality of protection services to cause the plurality of protection services to utilize respective protection rule configurations corresponding to a combination of the selected behavioral models to generate the respective malicious activity assessments with respect to the information technology asset.

5. The method of claim 1, further comprising:
   displaying a second graphical interface element that enables the user to select a detection sensitivity to be associated with the information technology asset; and
   causing distribution of a detection sensitivity indicator indicating the selected detection sensitivity to the plurality of protection services to cause the plurality of protection services to utilize the plurality of respective protection rule configurations that further correspond to the detection sensitivity to generate the respective malicious activity assessments with respect to the information technology asset.

6. The method of claim 1, further comprising:
   displaying a second graphical interface element that enables the user to disable one or more protection technology sets, each protection technology set including at least two respective protection rules of the plurality of protection rule configurations; and
   causing distribution of a disablement indicator indicating the disabled one or more protection technology sets to the plurality of protection services to cause the plurality of protection services to not include the disabled one or more protection sets when generating the respective malicious activity assessments with respect to the information technology asset.

7. The method of claim 1, further comprising:
   displaying a second graphical interface element that enables the user to disable the plurality of protection rule configurations independently; and
   causing distribution of a disablement indicator indicating disabled protection rules to the plurality of protection services to cause the plurality of protection services to not include the disabled protection rules when generating the respective malicious activity assessments with respect to the information technology asset.

8. A method of generating a malicious activity assessment, comprising:
   receiving a behavioral model indicator associating an information technology asset with n behavioral models of a plurality of behavioral models that correspond to a plurality of respective protection rule configurations, the n behavioral models corresponding to n respective protection rule configurations of the plurality of protection rule configurations; and responsive to receiving the behavioral model indicator, generating the malicious activity assessment with respect to the information technology asset, using at least one processor, based on a protection rule configuration corresponding to a combination of the n behavioral models, n being greater than or equal to two.

9. The method of claim 8, wherein receiving the behavioral model indicator comprises:
receiving the behavioral model indicator associating a computer with the n behavioral models.

10. The method of claim 8, wherein receiving the behavioral model indicator comprises:
receiving the behavioral model indicator associating a user account with the n behavioral models.

11. The method of claim 8, further comprising:
receiving a detection sensitivity indicator indicating a detection sensitivity to be associated with the information technology asset, wherein at least one of the n protection rule configurations includes a plurality of first protection rules having respective first rule sensitivities; and
adjusting the first rule sensitivities based on the detection sensitivity.

12. The method of claim 8, further comprising:
receiving a disablement indicator indicating one or more protection technology sets to be disabled with respect to the information technology asset, each protection technology set including at least two respective protection rules of the plurality of protection rule configurations;
wherein generating the malicious activity assessment with respect to the information technology asset does not take into account protection rules that are included in the one or more disabled protection technology sets.

13. The method of claim 8, further comprising:
receiving a disablement indicator indicating one or more individually disabled protection rules of the plurality of protection rule configurations;
wherein generating the malicious activity assessment with respect to the information technology asset does not take into account the one or more individually disabled protection rules.

14. The method of claim 8, wherein the behavioral model indicates that the n protection rule configurations are to be applied by n respective protection services deployed on one or more processing modules during operations that are to be performed by the n protection services, each protection rule configuration including one or more protection rules selected from a plurality of protection rules, each protection rule indicating respective information to be collected with respect to the information technology asset for generation of the malicious activity assessment.

15. A system comprising:
one or more processors;
a detection module, implemented using at least one of the one or more processors, configured to detect a behavioral model indicator that associates an information technology asset with a first behavioral model of a plurality of behavioral models that correspond to a plurality of respective protection rule configurations, the first behavioral model corresponding to a first protection rule configuration of the plurality of protection rule configurations, the detection module further configured to detect a disablement indicator that indicates one or more protection technology sets to be disabled with respect to the information technology asset, each protection technology set including at least two respective protection rules of the plurality of protection rule configurations; and
an assessment module, implemented using at least one of the one or more processors, configured to generate a malicious activity assessment with respect to the information technology asset based on the first protection rule configuration in response to the behavioral model indicator being detected, the malicious activity assessment does not take into account protection rules that are included in the one or more disabled protection technology sets.

16. The system of claim 15, wherein the information technology asset is a computer.

17. The system of claim 15, wherein the information technology asset is a user account.

18. The system of claim 15, wherein the behavioral model indicator further associates the information technology asset with one or more second behavioral models of the plurality of behavioral models, wherein the one or more second behavioral models correspond to one or more respective second protection rule configurations of the plurality of protection rule configurations; and
wherein the malicious activity assessment is further based on the one or more second protection rule configurations.

19. The system of claim 15, wherein the detection module is further configured to detect a detection sensitivity indicator that indicates a detection sensitivity to be associated with the information technology asset, wherein the first protection rule configuration includes a plurality of first protection rules having respective first rule sensitivities; and
wherein the system further comprises:
an adjustment module configured to adjust the first rule sensitivities based on the detection sensitivity.

20. The system of claim 15, wherein the first behavioral model indicates which protection rules selected from a plurality of protection rules are to be applied by each of a plurality of protection services during a plurality of operations that are to be performed by the plurality of respective protection services, each protection rule indicating respective information to be collected with respect to the information technology asset for generation of the malicious activity assessment with respect to the information technology asset.

* * * * *